United States Patent [19]

Kay

[11] Patent Number: 4,687,691

[45] Date of Patent: Aug. 18, 1987

[54] HONEYCOMB SPLICED MULTILAYER FOAM CORE AIRCRAFT COMPOSITE PARTS AND METHOD FOR MAKING SAME

[75] Inventor: Bruce F. Kay, Milford, Conn.

[73] Assignee: United Technologies Corporation, Hartford, Conn.

[21] Appl. No.: 856,896

[22] Filed: Apr. 28, 1986

[51] Int. Cl.[4] .................... B32B 3/26; B32B 31/20
[52] U.S. Cl. ................................... 428/73; 156/252; 156/303.1; 156/307.3; 156/307.7; 428/76; 428/117; 428/138; 428/218; 428/315.9; 428/316.6
[58] Field of Search ............... 156/78, 303.1, 197, 156/307.3, 307.7, 252; 428/71, 73, 76, 117, 315.9, 316.6, 218, 138; 181/288, 290, 294

[56] References Cited

U.S. PATENT DOCUMENTS

| | | | |
|---|---|---|---|
| 3,249,659 | 5/1966 | Voelker | 428/117 |
| 3,578,526 | 5/1971 | Harding | 156/303.1 |
| 3,650,863 | 3/1972 | Klinkosch | 156/78 |
| 3,998,219 | 12/1976 | Mercer et al. | |
| 4,042,746 | 8/1977 | Hofer | 428/218 |
| 4,132,042 | 1/1979 | DiMaio | 428/117 |
| 4,351,870 | 9/1982 | English | 428/117 |
| 4,409,054 | 10/1983 | Ryan | 428/117 |
| 4,594,120 | 6/1986 | Bourland et al. | 156/252 |
| 4,598,008 | 7/1986 | Vogt et al. | 428/117 |

*Primary Examiner*—Jerome Massie
*Attorney, Agent, or Firm*—A. Dean Olson

[57] ABSTRACT

Aircraft composite components having foam cores comprising at least two foam sheets joined with a sheet of honeycomb to form a foam-honeycomb-foam sandwich. The layers of sheet foam are in contact with each other and the honeycomb cells extend a substantially equal depth into and generally perpendicular to the sheet foam layers. The composite component has increased shear strength. The aircraft composite component can be made by aligning a layer of honeycomb between and generally perpendicular to two layers of sheet foam. A compressive force is applied generally perpendicular to at least one layer of sheet foam so that the honeycomb cells penetrate each of the two layers of sheet foam to a substantially equal depth so that the layers of foam contact each other to form a foam-honeycomb-foam sandwich. The foam core is surrounded by resin impregnated fibers and cured.

10 Claims, 2 Drawing Figures

HONEYCOMB SPLICED MULTILAYER FOAM CORE AIRCRAFT COMPOSITE PARTS AND METHOD FOR MAKING SAME

TECHINICAL FIELD

The field of art to which this invention pertains is aircraft composite components particularly those having foam cores and methods for making the same.

BACKGROUND ART

Composites are increasingly used in aerospace technology as a replacement for metals. In airplanes and helicopters, composites are an improvement over metals as they are lightweight, strong, durable and can be manufactured economically. Many aircraft composite components are comprised of a foam core surrounded with a composite skin as this provides a lightweight rigid structure.

The foam core can be comprised of a plurality of thin foam sheets joined together instead of a single piece of foam. Thick pieces of many types of foam can be expensive because it can take long periods of time for the foam to rise during its production. Consequently, the foam core is made of layers of foam sheets joined together. Usually these foam sheets are joined using conventional adhesives, however, this can result in composite parts having low strengths.

Accordingly, there has been a constant search in the field of aircraft composite parts for components having improved strengths.

DISCLOSURE OF THE INVENTION

This disclosure is directed to aircraft composite components that have foam cores with improved shear strength. Aircraft composite components comprise a composite skin surrounding a foam core. The foam core comprises alternating layers of at least two layers of sheet foam and at least one layer of honeycomb. The honeycomb layer has a greater compressive strength than the sheet foam layers. The layers of sheet foam have substantially equal compressive strengths and are in contact with each other. The layer of honeycomb cells extend a substantially equal depth into and generally perpendicular to each of said two layers of sheet foam to form a foam-honeycomb-foam sandwich.

Another aspect of this invention is a method of making an aircraft composite component that has increased shear strength. At least two foam sheets are joined to make a core, which is then surrounded by resin impregnated fibers and cured. The improvement comprises joining the foam sheets by aligning a layer of honeycomb so that its cells are between and generally perpendicular to two layers of sheet foam. A compressive force is applied generally perpendicular to at least one layer of sheet foam so that the honeycomb cells penetrate each of the two layers of sheet foam to a substantially equal depth so that the layers of foam contact each other to form a foam-honeycomb-foam sandwich. The honeycomb cells have a compressive strength great than that of the sheet foam.

Yet another aspect of this invention is another method of making an aircraft composite component that has increased shear strength. At least two foam sheets are joined to make a foam core, the foam core is surrouned with resin impregnated fibers and the resin is cured. The improvement comprises joining the foam sheets by aligning a layer of honeycomb so that the cells are generally perpendicular to a first layer of sheet foam. A compressive force is applied generally perpendicular to the layer of sheet foam so that the honeycomb cells penetrate the layer of sheet foam. A second layer of sheet foam that has a compressive strength substantially less than the first layer of sheet foam is aligned generally perpendicular to and against the honeycomb layer's exposed side. A compressive strength is applied generally perpendicular to at least one layer of sheet foam so that the honeycomb cells penetrate said layers of sheet foam to a depth where the foam layers contact each other to form a foam-honeycomb-foam sandwich.

These aircraft composite components have foam cores with increased shear strength resulting in an increase in overall component strength. Thus, they make a significant advance in the aerospace field of art.

The foregoing and other objects, features and advantages will be apparent from the specification, claims and from the accompanying drawings which will illustrate an embodiment of the invention.

BEST MODE FOR CARRYING OUT THE INVENTION

Figure 1:
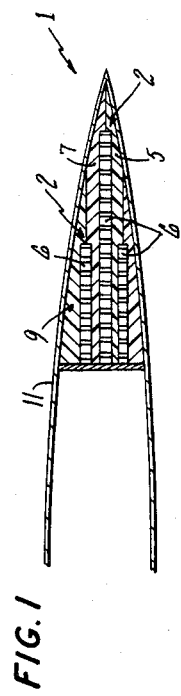
FIG. 1 is a side view cutaway of an airplane wing trailing edge fairing showing the spliced foam sheets of this invention.

The foam sheets of this invention are lightweight, rigid, closed-cell foams having a thickness of about 0.4 inch to about 4 inches because this brackets the range of thicknesses that provide high strength, environmentally stable, lightweight, close tolerance, aircraft quality foams manufactured by the rise method. The foam has a density of about 0.5 pounds per cubic foot (lb/ft$^3$) to about 20 lb/ft$^3$. Below about 0.5 lb/ft$^3$, the foam tends to be crushed as the honeycomb is forced through the foam and above about 20 lb/ft$^3$, the foam crushes the honeycomb so that the honeycomb does not penetrate the foam sheet. It is preferred that the density is about 2 lb/ft$^3$ to about 4 lb/ft$^3$ because at these densities the foams can be more weight efficient and provide smoother surfaces than honeycomb core sandwich structures. The foam should have a compression strength of about 20 pounds per square inch (psi) to about 200 psi because below about 20 psi, the force required to imbed (penetrate) the honeycomb in the foam for the lightest available honeycombs would exceed the compressive strength of the honeycomb and cause it to collapse and above about 200 psi, the size of the honeycomb cells would become too small to penetrate the foam without crushing the foam. It is preferred that the compression strength is about 50 psi to about 100 psi. The foams used in this invention have a shear strength of about 80 psi to about 160 psi because of the preceding considerations and a fixed relationship between shear strength and compression strength. It is preferred that the foams used in this invention are resistant to atmospheric conditions such as moisture, humidity and temperature extremes to which aircraft components are exposed in worldwide operations. There are a variety of foams which fill the above qualifications including polyimides (annealed or heat treated), polyurethanes, polyvinyl chloride (PVC) and cellular cellulose acetate (CCA). An exemplary foam is Rohacel ™ polyimide available from Rohm Corporation of Germany which is distributed in the United States by Cyro Corporation, Orange, Connecticut. Another exemplary foam is Strux CCA ™ foam available from Deltex Associates, Bridgewater, New Jersey.

The honeycomb material of this invention is an open cell material whose compression strength is greater than that of the foam described above. By greater is meant at least about 50% greater, otherwise the honeycomb will not be able to penetrate the foam. Typically, the honeycomb has hexagonal cells although honeycomb having other than hexagonal shaped cells would work in the practice of this invention. The cell diameter or nodal size of the honeycomb is about 0.125 inch to about 0.375 inch because below about 0.125 inch, the cells are too small to penetrate the foam without crushing it, and above about 0.375 inch, the strength of the honeycomb becomes so low that it would crush before penetrating the foam. It is preferred that the nodal size is about 0.188 inch to about 0.313 inch for ease of penetration and compatibility of compression strengths in typical applications. The thickness of the honeycomb cell walls is about 0.001 inch to about 0.003 inch because above about 0.003 inch, the honeycomb density becomes excessive for the application, and below about 0.001 inch, the cell walls lack the stability to provide adequate compressive strength. The thickness of the honeycomb sheet is about 0.0625 inch to about 1 inch because below about 0.0625 inch, there is insufficient penetration to achieve an adequate shear strength for splice purposes, and above about 1 inch, there is no longer any increase in strength. Preferably, the honeycomb sheet is about 0.25 inch to about 0.5 inch in thickness because below about 0.25 inch, tolerances could reduce penetration below minimum levels needed to achieve adequate shear strengths, and above about 0.5 inch, no useful purpose is served and excess weight will accrue. The honeycomb is typically comprised of a variety of materials such as aluminum, fiberglass, polymers, composites, paper, and phenolics. An exemplary material is Nomex ™ fiberglass available from E. I. DuPont de Nemours Company (Wilmington, Del.). Other exemplary materials are standard aluminum honeycomb cores procurable to military specifications.

The adhesives used in the preferred embodiments of this invention are conventional adhesives such as epoxies, polyesters and nitrile phenolics. Preferably, these are used as a paste or film. The adhesive, foam and honeycomb materials should be selected so that they are compatible. For example, it is preferred to use thermosetting room temperature curing epoxy adhesives, and annealed polyimide foams, with Nomex ™ honeycomb because of their high strength to weight ratios, environmental durability and ease of manufacture. It is also preferred to use film epoxy adhesive, heat treated polyimide foam and aluminum honeycomb because of its higher strength.

The fibers that form the composite skins (or facings) that surround the foam core are conventional fibers such as graphite, Kevlar ™ polyamide fiber (E. I. DuPont De Nemours, Wilmington, Del.) and fiberglass. The resins used in the composite skins surrounding the foam core are conventional composite resins such as epoxies and polyesters. The resin and fibers are selected such that the combination is compatible and forms a conventional composite such as are used in the aircraft art.

Figure 2:
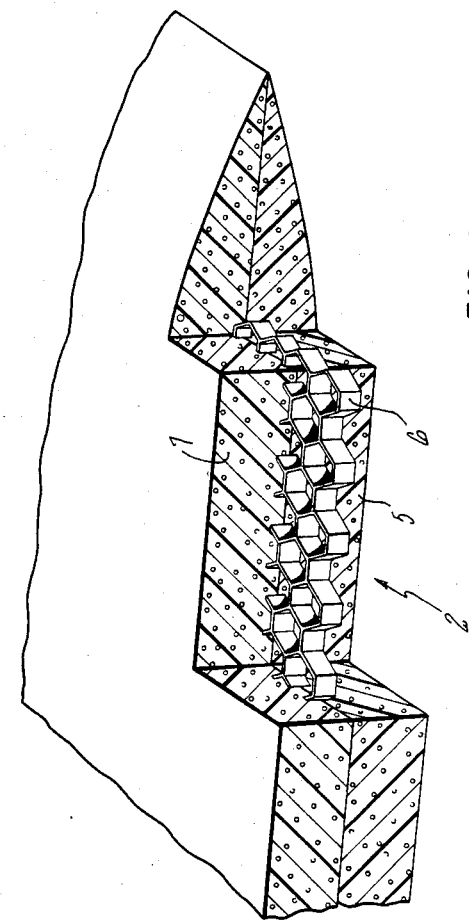
FIG. 2 is a perspecitve view cutaway of an airplane wing trailing edge fairing showing the honeycomb spliced foam.

A clearer understanding of this invention may be had by reference to FIG. 1 which illustrates a side view cutaway of an airplane wing trailing edge fairing 1 showing the splice foam sheets of this invention. A foam-honeycomb-foam sandwich 2 comprises sheets of foam 5 and 7 in contact while a sheet of honeycomb 6 is between and penetrates each sheet. Preferably the layer of honeycomb penetrates the foam to a depth of about 0.2 inch to about 1 inch. Below about 0.2 inch, the component strength is not substantially increased and above 1 inch, there is little increase in strength. Successive layers can be built up to fill the component interior 9. Finally, a composite skin 11 (layup or winding) surrounds the component. FIG. 2 is a perspective view cutaway of an airplane wing trailing edge fairing showing the honeycomb spliced foam. The foam-honeycomb-foam sandwich 2 comprises sheets of foam 5 and 7 in contact with a honeycomb sheet 6 between and penetrating foam sheets 5 and 7.

The aircraft composite components of this invention are made by aligning a sheet of the honeycomb between two sheets of the foam so that the honeycomb cells are perpendicular to the foam sheets. A force is then applied to the foam sheets compressing them against the honeycomb so that the honeycomb penetrates the foam until both sheets of foam are in contact. Because the foam sheets have been selected so that they have substantially equal compressive strengths, the honeycomb penetrates both sheets of foam to a similar depth. By substantially equal compressive strengths is meant strengths within about 10% of each other. It is preferred that prior to joining the two plates of foam to form the foam-honeycomb-foam sandwich, adhesive is spread on at least one side of the foam resulting in a redundant foam splice. Thus, the two sheets of foam are not only mechanically interlocked but also adhesively interlocked. Successive sheets of foam can be joined using this invention to form the foam core thicknesses acquired of the below-described aircraft composite components.

Alternatively, the honeycomb sheet is compressed into first one foam sheet and then the above described foam-honeycomb-foam sandwich is made by compressing the still exposed side of the honeycomb into the second foam sheet. In this aspect, the first foam sheet has a compressive strength substantially greater than the second foam sheet. The differential compressive strengths assure an approximately equal penetration of both foam sheets by the honeycomb cells as first one foam sheet is penetrated and then both foam sheets are penetrated. Thus, the compressive strengths should be such that in combination with the depth of the first penetration into the foam sheet the foam sheets are penetrated an approximately equal distance by the honeycomb. Thus, for example, the greater the difference in compressive strengths, the deeper the first penetration into the foam sheet should be. This method can be used to join foam sheets of different compressive strengths and is advantageous because honeycomb penetration into the lower strength foam would not be possible using simultaneous pressure. Also, penetration depth control is enhanced and becomes inspectable.

The foam-honeycomb-foam stack can be machined to the desired shape. The foam core is then covered or surrounded by a composite skin through the use of conventional resin impregnated fiber layup or wrap methods. The composite skin facings can be applied to the core sandwich by winding or lay-up of fibers which may optionally be preimpregnated with resin, followed by curing.

EXAMPLE

A sheet of foam was coated with a layer of paste adhesive. The foam sheet was stacked sequentially with a honeycomb core sheet and another layer of foam. The two sheets of foam were pressed together until they made contact. The adhesive was allowed to cure for about 8 hours at room temperature. The joined stack of foam was machined to the desired shape and composite skin facings were applied to the machined core stack. The core and facing assemblage was placed in a mold having the same shape as the finished part. The mold was fabricated with a top and bottom segment to fit around the component. About 50 psi was applied to the mold at a temperature of about 350° F. for about 2 hours to cure the composite facings to the core. The mold was opened and the cured part removed.

These foam cores have improved shear strength over multilayer foam cores that are joined together with adhesives. The following table details shear strengths for samples of a wing trailing edge fairing with adhesively bonded foam cores containing bond voids in comparison to multilayer foam cores spliced with honeycomb. Composite parts having adhesively joined sheets that upon examination have no voids surpass the design requirement for an exemplary wing trailing edge fairing. Howver, composite parts can have shear strengths significantly lower than the design requirement as a result of bond voids between foam sheets. The honeycomb spliced sheets of this invention provide consistent shear strengths that exceed the design requirement.

TABLE

| Shear Strength of a Wing Trailing Edge Fairing (lb/inch) | | | |
| --- | --- | --- | --- |
| Design Reqmt. | Adhesively Joined Sheets (No Voids) | Adhesively Joined Sheets (With Voids) | Honeycomb Spliced Sheets |
| 60 | 178 | 20 | 111 |

These aircraft composite components include secondary structures such as doors (equipment compartment, landing gear, weapon engine compartment, furnishings, maintenance, etc.); control surfaces (ailerons, flaps, elevators, trim tabs, rudders, etc.); helicopter rotor blades (main and tail); fairings (aerodynamic wing leading and trailing edge, empennage, main rotor pylon, fuselage, pods, etc.); winglets; fins; strakes; interior panels; skin panels and equipment supports.

These aircraft composite components have foam cores with increased shear strength resulting in an increase in overall component strength. They facilitate the use of built-up foam cores which provide thick, high strength, lightweight, smooth composite components. In addition, the positive interlock can eliminate the necessity for the testing of the foam-to-foam joint. It has been discovered that testing was required for adhesively bonded foam sheet cores because of the presence of adhesive voids between the foam sheets. However, suitable detection methods for low weight foams are not readily available. Thus, this positive interlock system eliminates the specific problem of adhesive void detection and the more general joint weakness problem in that it provides a positive guaranteed interlocked foam core and consistent strengths. Thus, this helicopter composite components make a significant advance in the field of composite components.

It should be understood that the invention is not limited to the particular embodiment shown and described herein, but that various changes and modifications may be made without departing from the spirit or scope of this concept as defined by the following claims.

I claim:

1. Aircraft composite components, comprising a composite skin surrounding a foam core wherein the improvement comprises:
   a. said foam core comprising alternating layers of at least two layers of sheet foam and at least one layer of honeycomb having cells;
   b. said honeycomb layer having a greater compressive strength than said layers of sheet foam;
   c. said layers of sheet foam having substantially equal compressive strength;
   d. said layers of sheet foam in contact with each other at least through each of the honeycomb openings; and
   e. said layer of honeycomb cells extending a substantially equal depth into and generally perpendicular to each of said two layers of sheet foam but not penetrating entirely through said sheet foam layers to form a foam-honeycomb-foam sandwich;
   wherein the composite component has increased shear strength.

2. The aircraft composite components as recited in claim 1 wherein said sheet foam is about 0.4 inch to about 4 inches in thickness and said cells are about 0.0625 inch to about 1 inch in thickness and said layer of honeycomb cells extend a depth of about 0.2 inch to about 1 inch into each of said two layers of sheet foam.

3. A method of making an aircraft composite component comprising joining at least two foam sheets to make a foam core, surrounding the foam core with resin impregnated fibers, and curing said resin impregnated fibers wherein the improvement comprises joining said foam sheets by
   a. aligning a layer of honeycomb having cells so that said cells are between and generally perpendicular to two layers of sheet foam, and said honeycomb cells having a compressive strength greater than that of the sheet foam; and
   b. applying a compressive force generally perpendicular to at least one layer of sheet foam so that the honeycomb cells pentrate each of the two layers of sheet foam to a substantially equal depth where said layers of foam contact each other at least through each of the honeycomb openings to form a foam-honeycomb-foam sandwich said honeycomb not penetrating entirely through said foam sheets; resulting in a composite component that has increased shear strength in comparison to adhesively bonded foam sheets.

4. The method of making an aircraft composite component as recited in claim 3 wherein said layer of honeycomb is about 0.0625 inch to about 1 inch in thickness and said layer of sheet foam is about 0.4 inch to about 4 inches in thickness and said honeycomb cells penetrate each of said layers of sheet foam to a substantially equal depth of about 0.2 inch to about 1 inch.

5. A method of making an aircraft composite component comprising joining at least two foam sheets to make a foam core, surrounding the foam core with resin impregnated fibers, and curing said resin impregnated fibers wherein the improvement comprises joining said foam sheets by
 a. aligning a layer of honeycomb having cells so that the cells are generally perpendicular to a first layer of sheet foam;
 b. applying a compressive force generally perpendicular to said layer of sheet foam so that the honeycomb cells penetrate said layer of sheet foam;
 c. aligning a second layer of sheet foam, having a compressive strength substantially less than said first layer, generally perpendicular so said layer of honeycomb against said honeycomb layer's exposed side; and
 d. applying a compressive strength generally perpendicular to at least one layer of sheet foam so that the honeycomb cells penetrate said layers of sheet foam to a depth where said layers of foam contact each other at least through each of the honeycomb openings to form a foam-honeycomb-foam sandwich said honeycomb not in contact with said resin impregnated fibers;
resulting in a composite component that has increased shear strength.

6. The aircraft composite component of claim 1 wherein said layers of sheet foam are adhesively bonded together.

7. The method of making an aircraft composite component of claim 3 wherein said two layers of sheet foam are adhesively bonded together.

8. The method of making an aircraft composite component of claim 5 wherein said two layers of sheet foam are adhesively bonded together.

9. Aircraft composite comopnents, comprising a composite skin surrounding foam core wherein the improvement comprises:
 a. said foam core comprising alternating layers of at least two layers of sheet foam and at least one layer of honeycomb having cells;
 b. said honeycomb layer having a greater compressive strength than said layers of sheet foam;
 c. said layers of sheet foam in contact with each other at least through each of the honeycomb openings; and
 d. said layer of honeycomb cells extending into and generally perpendicular to each of said two layers of sheet foam but not penetrating entirely through said sheet foam layer to form a foam-honeycomb-foam sandwich;
wherein the composite component has increased shear strength.

10. The aircraft composite component as recited in claim 9 wherein said layers of sheet foam are adhesively bonded together.

* * * * *